(No Model.)
J. NAUD, FILS.
HYDRANT COUPLING.
No. 591,140. Patented Oct. 5, 1897.
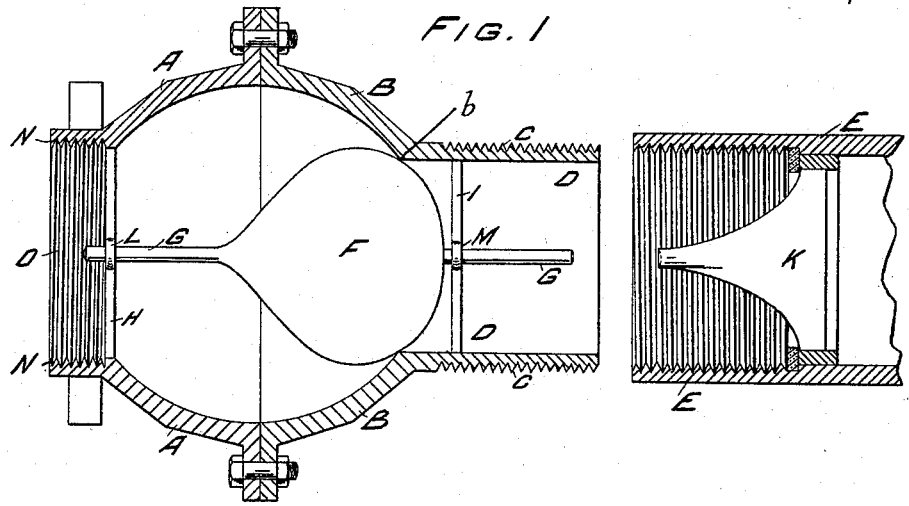
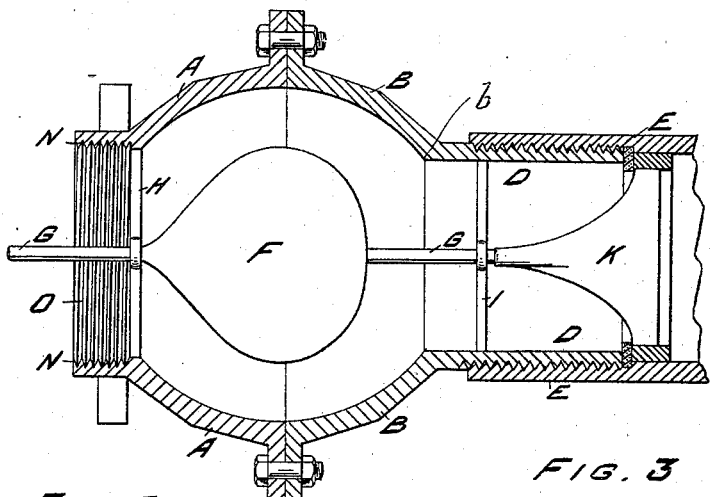
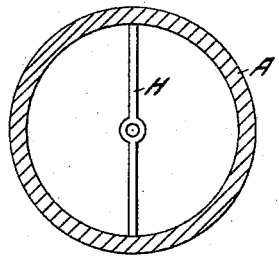
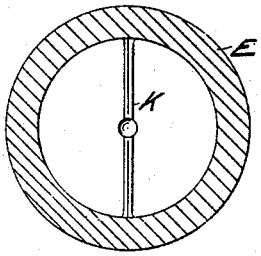
Witnesses
A. Bélanger.
J. B. Cusson.
Inventor
Jean Naud, fils.
Bélanger & Cusson
Attorneys

UNITED STATES PATENT OFFICE.

JEAN NAUD, FILS, OF MONTREAL, CANADA.

HYDRANT-COUPLING.

SPECIFICATION forming part of Letters Patent No. 591,140, dated October 5, 1897.

Application filed August 5, 1896. Serial No. 601,702. (No model.)

*To all whom it may concern:*

Be it known that I, JEAN NAUD, Fils, a British subject, and a resident of Montreal, Province of Quebec, Canada, have invented a certain new and useful Improvement in the Coupling of Fire-Hose to Hydrants, of which the following is a specification.

This invention has reference to a novel construction in a pipe-coupling, and refers more especially to a hydrant-coupling—that is to say, in a coupling for connecting the feed-pipe of a fire-engine with a hydrant.

The invention consists in the features of construction hereinafter fully described and claimed.

In the accompanying drawings, forming a part of this specification, Figure 1 is a central vertical section showing the two members of the coupling separated. Fig. 2 is a similar view with the members coupled. Fig. 3 is a sectional view of the member of the coupling that is attached to the hose. Fig. 4 is a sectional view of the member of the coupling attached to the hydrant and illustrating the interior supports for the valve.

Referring now to said drawings, the member of the coupling attached to the hydrant is preferably made in two sections A and B, suitably secured together and spherical in shape, to provide a chamber to receive a valve F. One end of this chamber provides a valve-seat $b$, while the spherical valve F is provided with stems G, extending from the ends thereof. These stems G pass through cross-pieces H and I at the ends of the spherical chamber, conveniently through the openings L and M in said cross-pieces H and I. The said valve-stems G are free to slide within the cross-pieces—that is to say, they are not provided with springs or other devices for opening or closing the valve. The said valve F is closed by the pressure of the water, and the pressure side of the valve slopes gradually toward the valve-stem, as shown, while the other side is circular, thus making the valve pear-shaped. The said member that is secured to the hydrant is provided with exterior screw-threads C on the cylindrical portion D and with the interior screw-threads N upon the circular end portion O. The other coupling member, or the one attached to the hose, is constructed in the usual manner with interior screw-threads E, while situated within the coupling member is a ram K, that is situated to engage the ends of the valves G when the coupling is made. The manner in which this valved coupling operates must be apparent, since the pressure of the water keeps the valve F closed at all times, except when the other coupling is screwed thereon, when the ram K abuts against the end of the valve F and moves the same from its seat. This coupling is especially useful for hydrants, since it allows the supply-hose of the fire-engine to be connected therewith without cutting off the water to other engines that may be connected with this hydrant. This is often found to be the case when more than one engine receives its supply of water from a single hydrant. When it is desired to connect additional supply-pipes, it is necessary to close the supply of water and thus make the other engines useless while the other connection is being made. This obviates this objection, since the connection can be made without regard to the other engines that may be connected therewith.

Having thus described my invention, what I claim as new, and desire to secure by Letters Patent, is—

A hydrant-coupling, comprising a body portion formed in halves A and B secured together, the part A being provided with an internally-screw-threaded portion O, and a guide H, and the part B being provided with an externally-screw-threaded pipe D, a valve-seat $b$, and a guide I; a valve F provided at each end with a stem G slidable in the said guides H and I; and an internally-screw-threaded pipe E engaging with the pipe C and provided with a ram K projecting within its screw-threaded portion and operating to open the said valve, substantially as set forth.

JEAN NAUD, FILS.

Witnesses:
A. BELANGER,
J. B. CUSSON.